(12) United States Patent  
Nakayama et al.

(10) Patent No.: US 6,269,357 B1  
(45) Date of Patent: Jul. 31, 2001

(54) INFORMATION PROCESSING SYSTEM, APPARATUS, METHOD AND RECORDING MEDIUM FOR CONTROLLING SAME

(75) Inventors: Mayumi Nakayama, Chofu; Keita Kimura, Kawasaki; Tadashi Nakayama, Chofu; Makoto Yamazaki, Chiba, all of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 08/972,744

(22) Filed: Nov. 18, 1997

Related U.S. Application Data

(60) Provisional application No. 60/060,787, filed on Oct. 3, 1997, and provisional application No. 60/060,798, filed on Oct. 3, 1997.

(30) Foreign Application Priority Data

Feb. 6, 1997 (JP) .................................................. 9-023487  
Apr. 1, 1997 (JP) .................................................. 9-082560

(51) Int. Cl.[7] ............................. G06F 17/30; G06F 15/16; H04N 11/02  
(52) U.S. Cl. ............................. 707/1; 709/200; 375/240; 375/240.01; 375/240.02; 375/240.03; 348/232  
(58) Field of Search .......................... 707/10, 1; 348/440, 348/390, 397, 232; 375/240, 240.01, 240.02; 709/200

(56) References Cited

U.S. PATENT DOCUMENTS

| | | | |
|---|---|---|---|
| 5,032,918 | * | 7/1991 | Ota et al. ............................. 358/209 |
| 5,034,804 | * | 7/1991 | Sasaki et al. ......................... 358/41 |
| 5,062,010 | * | 10/1991 | Saito .................................. 360/35.1 |
| 5,295,077 | * | 3/1994 | Fukuoka ............................. 358/479 |
| 5,343,243 | * | 8/1994 | Maeda ................................. 348/222 |
| 5,414,464 | * | 5/1995 | Sasaki ................................. 348/222 |
| 5,440,529 | * | 8/1995 | Takezawa et al. .................... 369/13 |
| 5,471,248 | * | 11/1995 | Bhargave et al. ................... 348/420 |
| 5,553,311 | * | 9/1996 | McLaughlin et al. .............. 395/884 |
| 5,572,336 | * | 11/1996 | Mikami et al. ..................... 358/444 |
| 5,671,445 | * | 9/1997 | Gluyas et al. ....................... 395/873 |
| 5,754,227 | * | 5/1998 | Fukuoka ............................. 348/232 |
| 5,754,258 | * | 5/1998 | Hanaya et al. ..................... 348/734 |
| 5,978,016 | * | 11/1999 | Lourette et al. ...................... 348/64 |

* cited by examiner

Primary Examiner—Thomas G. Black  
Assistant Examiner—Frantz Coby  
(74) Attorney, Agent, or Firm—Oliff & Berridge PLC

(57) ABSTRACT

To shorten the time required to transfer image data from a first information processing apparatus (e.g., an electronic camera) to a second information processing apparatus (e.g., a personal computer) the first information processing apparatus reduces the image data when it is determined that a slow interface is being used. Additionally, the reduced image data being transferred can be altered in size (enlarged or further reduced) prior to compression so that its size is best suited for the particular compression process.

57 Claims, 2 Drawing Sheets

INFORMATION PROCESSING SYSTEM, APPARATUS, METHOD AND RECORDING MEDIUM FOR CONTROLLING SAME

RELATED PROVISIONAL APPLICATIONS

This nonprovisional application claims the benefit of Provisional Applications Nos. 60/060,787 and 60/060,798, both filed Oct. 3, 1997.

INCORPORATION BY REFERENCE

The disclosures of the following priority applications are herein incorporated by reference: Japanese Patent Application No. 9-23487, filed Feb. 6, 1997 and Japanese Patent Application No. 9-82560, filed Apr. 1, 1997.

BACKGROUND OF THE INVENTION

1. Field of Invention

The present invention relates to an information processing system, apparatus, method and recording medium for controlling same and in particular to such apparatus and methods in which data, such as image data, is transferred in an efficient manner.

2. Description of Related Art

With the progress of semiconductor technologies, recording apparatus such as electronic cameras that record images or sound as digital data, and electronic notebooks that record images in the form of memos have become wide-spread among the public. Many of the apparatus include an interface so that the apparatus can be connected to external apparatus, such as a personal computer (PC), to output data such as recorded images and sound to the PC. Some of these recording apparatus include a plurality of interfaces.

The external apparatus (e.g., PC) can perform display of the images and/or reproduce the sound stored in the above mentioned recording apparatus. The recording apparatus that have a plurality of interfaces send data in the same way regardless of the interface that is actually being used. When an interface having a slow transfer speed is used, there is a problem that if the capacity of the transferred data is large, the transferring of the data takes an extremely long time.

For example, when an electronic camera transfers 30 KB of image data (640×480 pixels) via an SCSI interface, and when the computer changes the size of that image data to 106×80 pixels for display, since the transfer time of the data is approximately 160 milliseconds, and the time required to change the size of the image data and to display is approximately 173 milliseconds, it only takes a total of 333 milliseconds to display the image stored in the recording apparatus. On the other hand, when a serial interface having a transfer speed of 19,200 bps (bits per second) is used, the transfer time of the data is approximately 16 seconds, and the time for the size change of the image data and displaying of the image is approximately 173 milliseconds, and thus an extra 16 seconds is required to transfer and display the image stored in the recording apparatus.

When some of these recording apparatus transfer image data to a computer, it is common that the image data that is transferred has been compressed by, for example, the JPEG (Joint Photographic Experts Group) method.

In order to further decrease the data amount to be transferred, it is possible to reduce the picture image data by decreasing the number of pixels of picture image data to be sent. However, because the transfer speed is slow when using a serial interface and the like, it is preferred that the data amount be further reduced when sending even a reduced-size picture image. For this reason, the reduced-size picture image also can be compressed.

However, with the JPEG compression method, since the compression process is performed on blocks of, e.g., 8×8 pixels, it is preferable that the number of pixels on each side of the compression process (i.e., before compression and after decompression) are in multiples of 8. Thus, when compressing by the JPEG method after reducing the picture image data, depending on the number of pixels of the post-reduction picture image, it may be necessary to adjust the number of pixels on each side of the compression process thereby creating the problem where the process of reducing the data amount becomes complicated.

SUMMARY OF THE INVENTION

It is an object of the present invention to shorten the time required for transferring image data by reducing the amount of image data to be transferred according to the type of the interface that will be used.

According to one aspect of the investigation, an information processing system includes a first information processing apparatus coupled to a second information processing apparatus via either a first interface having a first transfer speed or via a second interface having a second, slower transfer speed. When coupled via the first interface, image data is transferred to the second information processing apparatus. When coupled via the second interface, image data is transferred to the second information processing apparatus after the image data is reduced.

The first information processing apparatus of this system includes evaluating means for evaluating whether the interface to be used is the first interface having the first transfer speed or the second interface having the second transfer speed. A reducing means reduces the data amount of the image data when the second interface having the second transfer speed is used. Transfer means transfers the image data via the first interface having the first transfer speed, or transfers the image data reduced by the reducing means via the second interface having the second transfer speed.

In the information processing system, when the first information processing apparatus (for example, an electronic camera) is connected to the second information processing apparatus (for example, a PC) via the interface having the first transfer speed (for example, the SCSI interface), it transfers the image data to the second information processing apparatus via the first interface. When the first information processing apparatus is connected to the second information processing apparatus via the second interface having the second transfer speed (for example, an RS-232C interface), the data amount of the image data is reduced, and the reduced image data is transferred to the second information processing apparatus via the second interface.

An information processing system according to another aspect of the invention includes a first information processing apparatus having reduction means for reducing prescribed image data to reduced image data having a number of pixels suited to the compression process of a prescribed compression method. A compression means compresses the reduced image data by the prescribed compression method, and a transfer means transfers the compressed reduced image data to a second information processing apparatus through an interface. The second information processing apparatus includes decompressing means for decompressing the compressed reduced image data that was transferred through the transfer means.

As an alternative to reducing the image data to obtain image data having a number of pixels suited to the particular compression process, the first information processing apparatus can include dummy data attachment means that makes the number of pixels of the image data suitable for the compression process by adding dummy data when the prescribed image data has a number of pixels that are not suited to the compression process. The compression means then performs the compression process of the prescribed image data together with the dummy data that was attached by way of the dummy data attachment means.

A recording medium includes a control program having computer-readable instructions so that the first information processing apparatus selectively reduces image data based on the type of interface being used and/or reduces or attaches dummy data to the image data prior to compression.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
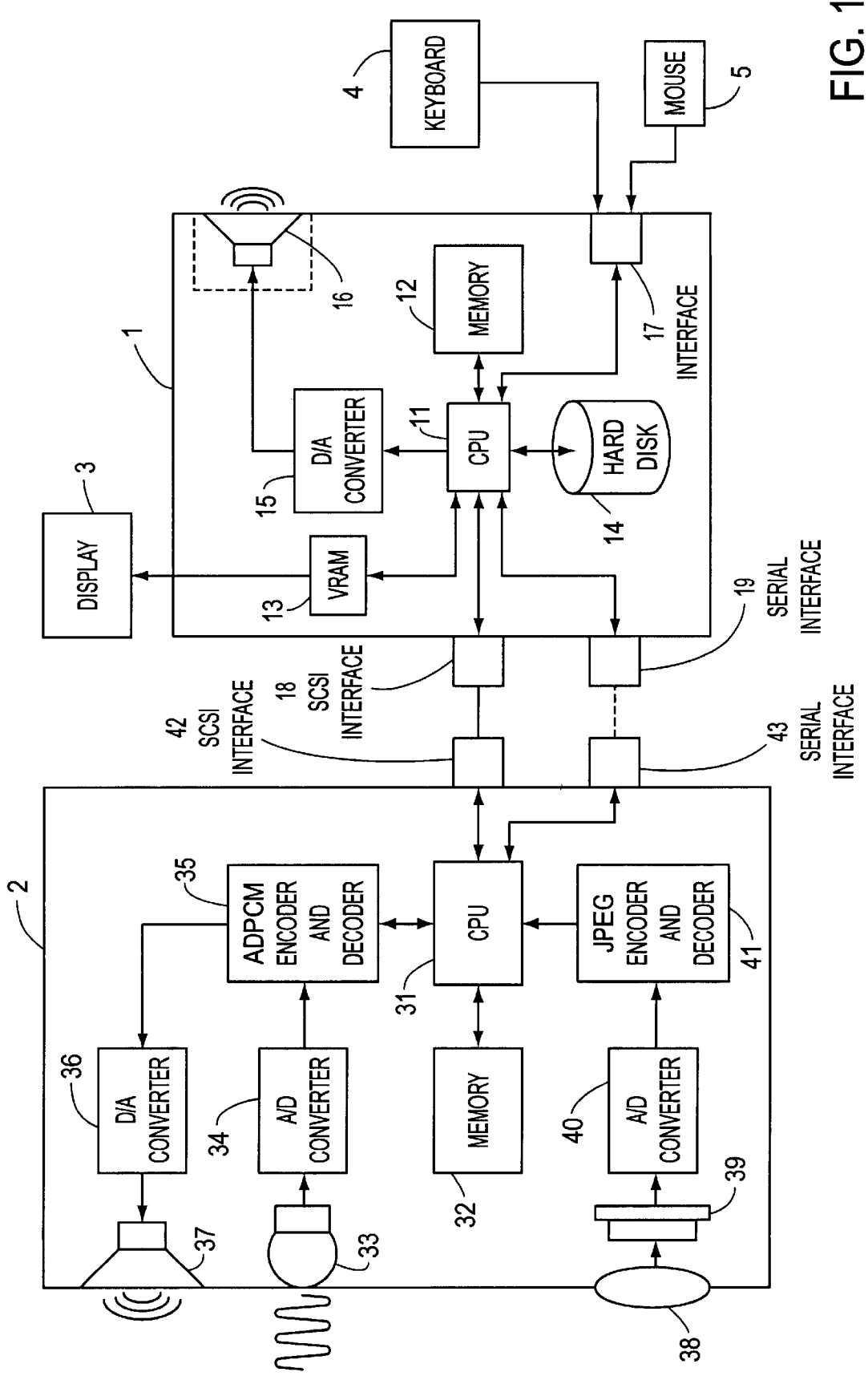
FIG. 1 is a block diagram of an information processing system according to one embodiment of the present invention.

FIG. 1 shows an information processing system according to one embodiment of the present invention. In this information processing system, a computer 1 and an electronic camera 2 are coupled via at least either high speed SCSI interfaces 18 and 42 or low speed serial interfaces 19 and 43.

In the computer 1, the CPU 11 operates in accordance with a program stored in the memory 12, which includes, for example ROM and/or RAM. The program also can be stored in the hard disk 14. CPU 11 performs various processing according to such programs.

The memory 12 temporarily stores programs or data being processed, and also stores programs or data that perform specified operations. The VRAM 13 has memory areas that correspond to each pixel of a display 3, and outputs the value of those memory areas to the display 3.

The hard disk 14 can store various programs or data, for example, the program that carries out the operations that will be described hereafter.

The D/A converter 15 converts sound data provided from the CPU 11 to an analog signal and outputs to the speaker 16.

The interface 17 is connected to input devices such as, for example, the keyboard 4 or the mouse 5 or the like, and supplies signals from these devices to the CPU 11.

The SCSI interface 18 performs the sending and receiving of the data in accordance with the standards of the SCSI (Small Computer System Interface).

The serial interface 19 performs sending and receiving of the data, for example in accordance with the standards of the RS-232C.

In the electronic camera 2, the CPU 31 (which functions as evaluating means, reducing means, compression means and transfer means) operates in accordance with one or more programs stored in the memory 32, which includes a ROM, RAM, flash memory or the like, and performs various processing.

The memory 32 temporarily stores in the RAM data that is in the middle of processing, and also stores programs or data that perform specified operations. Memory 32 stores recorded image data or sound data in the flash memory part.

The microphone 33 converts sound to an analog sound signal, and outputs that signal to the A/D converter 34. The A/D converter 34 converts the supplied analog sound signal to a digital sound signal, and outputs that signal to the ADPCM encoder and decoder 35. The ADPCM encoder and decoder 35 compresses the digital sound signal in accordance with the ADPCM method, and also converts (decompresses) the compressed data to a digital sound signal by the ADPCM method.

The D/A converter 36 converts the digital sound signal supplied from the ADPCM encoder and decoder 35, and outputs it to the speaker 37 as analog sound data.

The lens 38 collects light from the photographic object onto the CCD 39. The CCD 39 photoelectrically converts the light from the object, and outputs an analog signal which corresponds to the image of the object to the A/D converter 40. The A/D converter 40 converts the analog image signal to a digital image signal, and outputs that signal to the JPEG encoder and the decoder 41. The JPEG encoder and decoder 41 compresses the supplied digital image signal in accordance with the JPEG (Joint Photographic Experts Group) method, and outputs the compressed data (JPEG data) to the CPU 31. The JPEG encoder and decoder 41 also decompresses specified JPEG data to a digital image signal.

The SCSI interface 42 performs sending and receiving of the data in accordance with the SCSI (Small Computer System interface) standards. The serial interface 43 performs sending and receiving of the data, for example, in accordance with the RS-232C standards.

Figure 2:
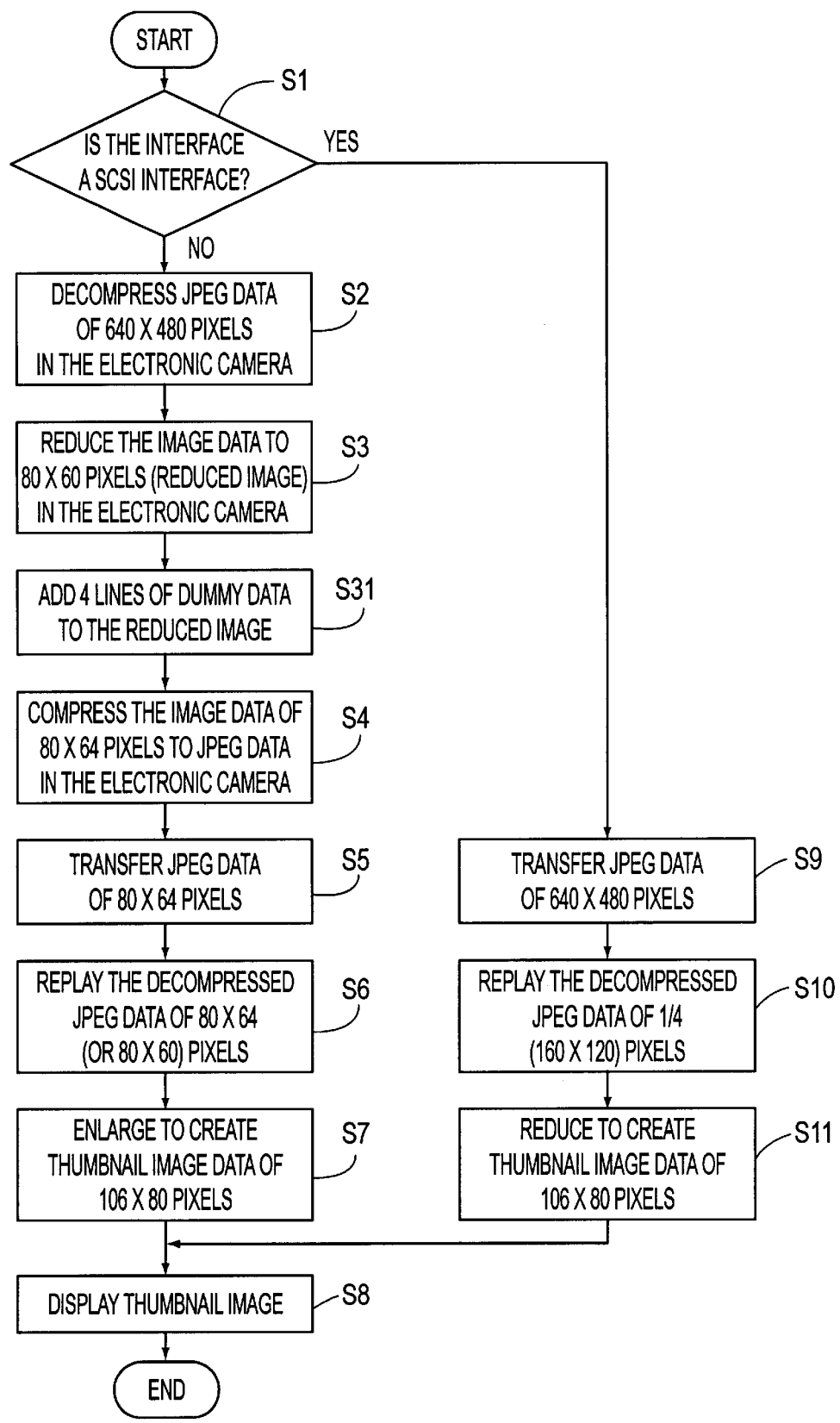
FIG. 2 is a flow chart explaining the operation when displaying a reduced image of an image stored in the electronic camera on a display.

Next, referring to the flow chart of FIG. 2, for example, when displaying a list of the images stored in the electronic camera 2, the operation of displaying the reduced images (thumbnail images) of the images stored in the electronic camera 2 on the display 3 is explained. In this example, it is assumed that the images are stored in the electronic camera in a compressed state.

In step S1, the CPU 31 of the electronic camera 2 evaluates (i.e., determines) whether it is connected to the computer 1 via the SCSI interfaces 42 and 18. When it is not connected to the computer 1 via the SCSI interface 42, flow proceeds to step S2. In step S2, the CPU 31 decompresses the specified JPEG images into images of 640×480 pixels using the JPEG encoder and decoder 41.

Then, in step S3, the CPU 31 thin-outs (i.e., reduces) specified pixels of the decompressed image data of 640×480 pixels, and creates image data of a reduced image having a pixel number of 1/64 (80×60 pixels compared to the original image).

Because it is easier to compress blocks of 8×8 pixels using the JPEG method, the size of the reduced image is altered so that its horizontal and vertical dimensions are multiples of 8. The number of pixels in the horizontal direction is 80, which is a multiple of 8. Since 60 is not a multiple of 8, in step S31, the CPU 31 attaches 4 lines of dummy data to the picture image data of 80×60 pixels, thereby creating picture image data of 80×64 pixels. In this way, the dummy data is added so as to make the number of pixels in the vertical direction a multiple of 8. As the attached dummy data, any of the data described below, which have a small adverse effect, are added as the first 4 lines when compressing and reproducing are used:

Intermediate grey data such as R=128, G=128, B=128
horizontal data for the front 4 lines
copy data for the front 4 lines Alternatively, data can be eliminated from the reduced image (e.g., making it a size of 80×56 pixels) so that it is more suitable for JPEG compression.

Next, in step S4, the CPU 31 causes the JPEG encoder and decoder 41 to compress the image data having a pixel number of 80×64 pixels. The CPU 31 then outputs the compressed JPEG data to the computer 1 via the serial interface 43 in step S5.

Then, the CPU 11 of the computer 1 receives the JPEG data via the serial interface 19, and in step S6, decodes (decompresses) the JPEG data and replays the decompressed image data, which has a pixel number of 80×64. Alternatively, in step S6, the CPU 11 of the computer 1 can decompress the transferred JPEG data and replay the reduced size image of only 80×60 pixels. In other words, the 4 lines of dummy data need not be replayed.

Next, in step S7, the CPU 11 of the computer 1 performs interpolation processing with respect to the decompressed image which has a pixel number of 80×64 (or 80×60), and creates an image (thumbnail image) having 106×80 pixels. Then in step S8, CPU 11 outputs the image data of that thumbnail image to the VRAM 13, and displays it on the display 3.

For example, when the electronic camera 2 transfers the 30 KB of image data (JPEG data) via the serial interface 43, which has a transfer speed of 19.2 kbps, the time required for decompressing the JPEG data in the electronic camera 2, thinning-out the image data, and re-compressing to the JPEG data is approximately 2 seconds, the transfer time of the data is approximately 1.6 seconds, and the time required for changing the size of the image data and displaying the image is approximately 157 milliseconds. Thus the total time is 3.7 seconds. The thumbnail image of the image stored in the electronic camera 2 is then displayed on the display 3 which is connected to the computer 1.

On the other hand, when the CPU 31 of the electronic camera 2 is connected to the computer 1 via the SCSI interface 42, flow proceeds from step S1 to step S9. In step S9, the CPU 31 outputs (transfers) the JPEG data of the specified image that has a pixel number of 640×480 pixels via the SCSI interface 42.

Then the CPU 11 of the computer 1 receives the data via the SCSI interface 18, and in step S10, the CPU 11 decompresses that data and replays ¼ of the image data for which the pixel number is 160×120 pixels. The ¼ image data results from replaying only ¼ of the decompressed JPEG data of 640×480 pixels as image data of 160×120 pixels.

Next, in step S11, the CPU 11 of the computer performs thin-out processing on the image for which the pixel number is 160×120 pixels, and creates an image (thumbnail image) of 106×80 pixels. Then, in step S8, the CPU 11 outputs the image data of that thumbnail image to the VRAM 13, and displays it on the display 3.

As described above, the CPU 31 of the electronic camera changes the pixel number of the transferred image data in accordance with the kind of interface which is used for the transfer.

Furthermore, in the above mentioned embodiment, the pixel number of the thumbnail image has been described as being 106×80. However it is not limited to this pixel number.

Although in FIG. 2, a description was provided of a single flow chart for a convenient explanation of the programs shown in the flow chart, the program that is executed by the CPU 31 of the electronic camera 2 is stored in the memory 32, and the program that is executed by the CPU 11 of the computer 1 is stored in the hard disk 14. Moreover, the programs shown in the flow chart of FIG. 2 may be supplied to the user already stored in the memory 32 and the hard disk 14, or they may be supplied to the user in the form of a CD-ROM (compact disk ROM) where they may be able to be copied to the memory 32 and the hard disk 14. The program(s) also can be provided via a communications network such as the Internet (World Wide Web).

Furthermore, in the embodiment described above, the number of pixels in the picture image data subsequent to reduction is 80×60, however, other sizes are possible.

In addition, in the embodiment described above, the program executed by the CPU 31 of the electronic camera 2 is stored in the memory 32, and the program that is executed by the CPU 11 of the computer 1 is stored in the hard disk 14. However, if CPU 11 of the computer 1 has the ability to execute the control which is executed by the CPU 31 of the electronic camera 2, then the program in the flow chart shown in FIG. 2 may be stored entirely in the hard disk 14 of the computer 1 and it may be executed by the CPU 11. Conversely, the program may be stored in the memory 32 of the electronic camera 2 and executed by the CPU 31.

The invention is not limited to only SCSI and RS-232C interfaces. Additionally, the interfaces can be hardwired, as shown, or wireless (for example, radiowave or infrared).

The image information can be a picture image (a photographed or scanned image) or a line drawing, for example.

The invention also is not limited to processes in which the optimal size for compression is blocks having a size that is a multiple of 8.

Additionally, as should be clear from the above description, according to one aspect of the invention, the data transmitted via the faster interface may or may not be compressed data. In either case, however, the data transmitted via the slower interface is reduced relative to the data transmitted via the faster interface.

The invention is not limited to JPEG compression. Thus, other compression methods can be used.

The invention is not limited to implementation by a programmed general purpose computer as shown in the preferred embodiment. For example, the invention can be implemented using one or more special purpose integrated circuit(s) (e.g., ASIC). It will be appreciated by those skilled in the art that the invention can also be implemented using one or more dedicated or programmable integrated or other electronic circuits or devices (e.g., hardwired electronic or logic circuits such as discrete element circuits, or programmable logic devices such as PLDs, PLAs, PALs or the like). In general, any device or assembly of devices on which a finite state machine capable of implementing the flow chart shown in FIG. 2 can be used.

While this invention has been described in conjunction with specific embodiments thereof, it is evident that many alternatives, modifications and variations will be apparent to those skilled in the art. Accordingly, the preferred embodiments of the invention set forth herein are intended to be illustrative, not limiting. Various changes may be made without departing from the spirit and scope of the invention as defined in the following claims.

What is claimed is:

1. An information processing system comprising:
   a first information processing apparatus that stores image data;
   a second information processing apparatus having a display;
   the first information processing apparatus coupled to the second information processing apparatus via one of a first interface having a first transfer speed and a second interface having a second transfer speed that is slower than the first transfer speed, such that the image data stored by the first information processing apparatus can be displayed by the display of the second information processing apparatus;

the first information processing apparatus including a controller that controls the transfer of the image data from the first information processing apparatus to the second information processing apparatus, when the first and second information processing apparatus are coupled via the first interface, the controller transfers the image data at the first transfer speed, and when the first and second information processing apparatus are coupled via the second interface, the controller reduces a data amount of the image data to form reduced image data and then transfers the reduced image data at the second transfer speed.

2. The system of claim 1, wherein the first interface is an SCSI interface and the second interface is a serial interface.

3. The system of claim 1, wherein the second information processing apparatus displays a converted image on the display after converting the transferred image data into image data having a specified number of pixels.

4. The system of claim 1, wherein said controller reduces the data amount of the image data, when the first and second information processing apparatus are coupled by the second interface, by reducing a pixel number of the image data.

5. The system of claim 1, wherein:

when the first and second information processing apparatus are coupled via the second interface, the controller changes the number of pixels of the reduced image data to a number of pixels that is suitable for a prescribed compression method to produce changed image data, compresses the changed image data using the prescribed compression method to produce compressed image data, and transfers the compressed image data to the second information processing apparatus via the second interface; and the second information processing apparatus further comprises means for decompressing the compressed image data that was transferred by the controller.

6. The system of claim 5, wherein the controller further reduces the number of pixels in the reduced image data such that the changed image data has less pixels than the reduced image data.

7. The system of claim 5, wherein the controller increases the number of pixels in the reduced image data by adding dummy data to the reduced image data such that the changed image data has more pixels than the reduced image data.

8. An information processing apparatus that stores image data, comprising:

a first interface that transfers the image data at a first transfer speed;

a second interface that transfers the image data at a second transfer speed that is slower than the first transfer speed;

evaluating means for determining whether the first interface or the second interface is being used to transfer the image data;

reducing means for reducing a data amount of the image data when the it is determined that the second interface is to be used to produce reduced image data; and transfer means for transferring the image data via the first interface when the first interface is determined to be used and for transferring the reduced image data via the second interface when the second interface is determined to be used.

9. The apparatus of claim 8, wherein the first interface is an SCSI interface, and the second interface is a serial interface.

10. The apparatus of claim 8, further comprising:

pixel changing means for changing the number of pixels of the reduced image data to a number of pixels that is suitable for a prescribed compression method, to produce changed image data;

compression means for compressing the changed image data using the prescribed compression method to produce compressed image data; and the transfer means transfers the compressed image data via the second interface.

11. The apparatus of claim 10, wherein the pixel changing means further reduces the number of pixels in the reduced image data such that the changed image data has less pixels than the reduced image data.

12. The apparatus of claim 10, wherein the pixel changing means increases the number of pixels in the reduced image data by adding dummy data to the reduced image data such that the changed image data has more pixels than the reduced image data.

13. An information processing apparatus that stores image data, comprising:

a first interface that transfers the image data at a first transfer speed;

a second interface that transfers the image data at a second transfer speed that is slower than the first transfer speed; and a controller coupled to the first interface and to the second interface to determine whether the first interface or the second interface is being used to transfer the image data, the controller reducing a data amount of the image data to produce reduced image data when it is determined that the second interface is to be used, the controller transferring the image data via the first interface when the first interface is determined to be used and transferring the reduced image data via the second interface when the second interface is determined to be used.

14. The apparatus of claim 13, wherein the first interface is an SCSI interface, and the second interface is a serial interface.

15. The apparatus of claim 13, wherein the controller changes the number of pixels of the reduced image data to a number of pixels that is suitable for a prescribed compression method when it is determined that the second interface is to be used, to produce changed image data, the controller compresses the changed image data using the prescribed compression method to produce compressed image data, and transfers the compressed image data via the second interface.

16. The apparatus of claim 15, wherein the controller changes the number of pixels by further reducing the number of pixels in the reduced image data such that the changed image data has less pixels than the reduced image data.

17. The apparatus of claim 15, wherein the controller changes the number of pixels by increasing the number of pixels in the reduced image data by adding dummy data to the reduced image data such that the changed image data has more pixels than the reduced image data.

18. A method of transferring image data between a first information processing apparatus and a second information processing apparatus, comprising the steps of:

determining whether the first and second information processing apparatus are coupled by a first interface having a first transfer speed or by a second interface having a second transfer speed that is slower than the first transfer speed;

transferring the image data via the first interface when the first and second information processing apparatus are determined to be coupled by the first interface; and reducing a data amount of the image data to produce reduced image data and transferring the reduced image data via the second interface when the first and second information processing apparatus are determined to be coupled by the second interface.

19. A recording medium that stores a computer-readable control program having instructions that are executable by a first information processing apparatus and by a second information processing apparatus to perform the steps of:

determining whether the first and second information processing apparatus are coupled by a first interface having a first transfer speed or by a second interface having a second transfer speed that is slower than the first transfer speed;

transferring image data from the first information processing apparatus to the second information processing apparatus via the first interface when the first and second information processing apparatus are determined to be coupled by the first interface; and reducing a data amount of the image data to produce reduced image data and transferring the reduced image data via the second interface when the first and second information processing apparatus are determined to be coupled by the second interface.

20. An information processing system comprising:

a first information processing apparatus that stores image data;

a second information processing apparatus having a display;

the first information processing apparatus coupled to the second information processing apparatus via an interface;

the first information processing apparatus further including:

pixel changing means for changing the number of pixels of the image data to a number of pixels that is suitable for a prescribed compression method, to produce changed image data;

compression means for compressing the changed image data using the prescribed compression method to produce compressed image data; and transfer means for transferring the compressed image data to the second information processing apparatus via the interface;

the second information processing apparatus further comprising means for decompressing the compressed image data that was transferred by the transfer means.

21. The system of claim 20, wherein the interface is a serial interface.

22. The system of claim 20, wherein the second information processing apparatus converts the decompressed data to image data having a prescribed number of pixels.

23. The system of claim 20, wherein the pixel changing means reduces the number of pixels in the image data such that the changed image data is reduced image data having less pixels than the image data.

24. The system of claim 20, wherein the pixel changing means increases the number of pixels in the image data by adding dummy data to the image data such that the changed image data is increased image data having more pixels than the image data.

25. An information processing system comprising:

a first information processing apparatus that stores image data;

a second information processing apparatus having a display;

the first information processing apparatus coupled to the second information processing apparatus via an interface;

the first information processing apparatus further including:

a controller coupled to the interface to change the number of pixels of the image data to a number of pixels that is suitable for a prescribed compression method to produce changed image data, compress the changed image data using the prescribed compression method to produce compressed image data, and transfer the compressed image data to the second information processing apparatus via the interface;

the second information processing apparatus further comprising a controller coupled to the interface to decompress the compressed image data that was transferred by the controller of the first information processing apparatus.

26. The system of claim 25, wherein the interface is a serial interface.

27. The system of claim 25, wherein the controller of the second information processing apparatus converts the decompressed data to image data having a prescribed number of pixels.

28. The system of claim 25, wherein the controller of the first information processing apparatus changes the number of pixels by reducing the number of pixels in the image data such that the changed image data is reduced image data having less pixels than the image data.

29. The system of claim 25, wherein the controller changes the number of pixels by increasing the number of pixels in the image data by adding dummy data to the image data such that the changed image data is increased image data having more pixels than the image data.

30. An information processing apparatus that stores image data, comprising:

an interface;

pixel changing means for changing the number of pixels of the image data to a number of pixels that is suitable for a prescribed compression method to produce changed image data;

compression means for compressing the changed image data using the prescribed compression method to produce compressed image data; and transfer means for transferring the compressed image data through the interface.

31. The apparatus of claim 30, wherein the interface is a serial interface.

32. The apparatus of claim 30, wherein the pixel changing means reduces the number of pixels in the image data such that the changed image data is reduced image data having less pixels than the image data.

33. The apparatus of claim 30, wherein the pixel changing means increases the number of pixels in the image data by adding dummy data to the image data such that the changed image data is increased image data having more pixels than the image data.

34. The apparatus of claim 33, wherein the compression method divides the image data into blocks having a prescribed number of pixels, and performs the compression method on each block, and the dummy data is data that is added to the image data so that the changed image data has the prescribed number of pixels.

35. The apparatus of claim 33, wherein the dummy data comprises intermediate grey data.

36. The apparatus of claim 35 wherein the dummy data comprises the average value data of the image data.

37. The apparatus of claim 33, wherein the dummy data comprises a portion of the image data.

38. The apparatus of claim 30, wherein the compression method comprises the JPEG method and the number of pixels that are suitable for the compression method are N×N, where N is a multiple of 8.

39. An information processing apparatus that stores image data, comprising:
- an interface; and
- a controller coupled to the interface to change the number of pixels of the image data to a number of pixels that is suitable for a prescribed compression method to produce changed image data, compress the changed image data using the prescribed compression method to produce compressed image data, and transfer the compressed image data through the interface.

40. The apparatus of claim 39, wherein the interface is a serial interface.

41. The apparatus of claim 39, wherein the controller changes the number of pixels by reducing the number of pixels in the image data such that the changed image data is reduced image data having less pixels than the image data.

42. The apparatus of claim 39, wherein the controller changes the number of pixels by increasing the number of pixels in the image data by adding dummy data to the image data such that the changed image data is increased image data having more pixels than the image data.

43. A method of transferring image data stored in a first information processing apparatus to a second information processing apparatus, comprising the steps of:
- changing the number of pixels of the image data to a number of pixels that is suitable for a prescribed compression method, to produce changed image data;
- compressing the changed image data using the prescribed compression method to produce compressed image data;
- transferring the compressed image data to the second information processing apparatus via an interface; and
- decompressing the compressed image data that was transferred in the second information processing apparatus.

44. The method of claim 43, wherein the changing step includes reducing the number of pixels in the image data such that the changed image data is reduced image data having less pixels than the image data.

45. The method of claim 43, wherein the changing step includes increasing the number of pixels in the image data by adding dummy data to the image data such that the changed image data is increased image data having more pixels than the image data.

46. A recording medium that stores a computer-readable control program having instructions that are executable by a first information processing apparatus and by a second information processing apparatus to perform the steps of:
- changing the number of pixels of the image data to a number of pixels that is suitable for a prescribed compression method, to produce changed image data;
- compressing the changed image data using the prescribed compression method to produce compressed image data;
- transferring the compressed image data to the second information processing apparatus via an interface; and
- decompressing the compressed image data that was transferred in the second information processing apparatus.

47. The recording medium of claim 46, wherein the changing step includes reducing the number of pixels in the image data such that the changed image data is reduced image data having less pixels than the image data.

48. The recording medium of claim 46, wherein the changing step includes increasing the number of pixels in the image data by adding dummy data to the image data such that the changed image data is increased image data having more pixels than the image data.

49. An information processing system comprising:
- a first information processing apparatus having storage means for storing information data, and transmission means for transmitting the information data by using one of a first transmission method and a second transmission method that is different from the first transmission method;
- a second information processing apparatus having receiving means for receiving the information data that has been transmitted from the transmission means, and reproduction means for reproducing the information data that has been received by the receiving means;
- the first information processing apparatus further including a controller that controls transmission of the information data from the first information processing apparatus to the second information processing apparatus, the controller changing a data amount of the information data that has been stored in the storage means of the first information processing apparatus and transmitting the data amount with the transmission means, depending on a classification of a transmission method that is used in the transmission means.

50. The information processing system of claim 49, wherein the first transmission method and the second transmission method have different data transmission speeds for transmitting the information data.

51. The information processing system of claim 50, wherein:
- the data transmission speed of the second transmission method is slower than the data transmission speed of the first transmission method; and
- the controller reduces the data amount of the information data when the information data is transmitted with the second transmission method more than the controller reduces the data amount of the information data when the information data is transmitted with the first transmission method.

52. An information processing system comprising:
- a first information processing apparatus having a memory to store information data, and a transmitter to transmit the information data by using one of a first transmission method and a second transmission method that is different from the first transmission method;
- a second information processing apparatus having a receiver to receive the information data that has been transmitted from the transmitter;
- the first information processing apparatus further including a controller that controls transmission of the information data from the first information processing apparatus to the second information processing apparatus, the controller changing a data amount of the information data that has been stored in the memory of the first information processing apparatus and transmitting the data amount with the transmitter, depending on a classification of a transmission method that is used in the transmitter.

53. The information processing system of claim 52, wherein the first transmission method and the second transmission method have different data transmission speeds for transmitting the information data.

54. The information processing system of claim 53, wherein:

the data transmission speed of the second transmission method is slower than the data transmission speed of the first transmission method; and the controller reduces the data amount of the information data when the information data is transmitted with the second transmission method more than the controller reduces the data amount of the information data when the information data is transmitted with the first transmission method.

55. A method of transferring information data between a first information processing apparatus and a second information processing apparatus, the method comprising the steps of:

determining a transmission method that is to be used to transmit the information data from a transmitter of the first information processing apparatus to a receiver of the second information processing apparatus, the transmission method being one of at least a first transmission method and a second transmission method that is different from the first transmission method;

transmitting the information data from the first information processing apparatus to the second information processing apparatus according to the determined transmission method; and changing a data amount of the information data that is transmitted from the first information processing apparatus to the second information processing apparatus based upon the determined transmission method.

56. The method of claim 55, wherein the first transmission method and the second transmission method have different data transmission speeds for transmitting the information data.

57. The method of claim 56, wherein:

the data transmission speed of the second transmission method is slower than the data transmission speed of the first transmission method; and the changing step includes reducing the data amount of the information data when the information data is transmitted with the second transmission method more than the data amount of the information data is reduced when the information data is transmitted with the first transmission method.

* * * * *